United States Patent

Wright et al.

[11] Patent Number: 5,722,735
[45] Date of Patent: Mar. 3, 1998

[54] UNIVERSAL WHEEL TRIM ATTATCHMENT SYSTEM

[75] Inventors: James P. Wright; Timothy L. Bates; Kevin D. Nash; Barry Lynn Roberts, all of Cookeville; John Davenport, Crossville, all of Tenn.

[73] Assignee: Pheonix USA, Inc., Cookeville, Tenn.

[21] Appl. No.: 834,688

[22] Filed: Apr. 1, 1997

Related U.S. Application Data

[63] Continuation of Ser. No. 602,508, Feb. 20, 1996, abandoned.

[51] Int. Cl.[6] ............................................. B60B 7/06
[52] U.S. Cl. ............................ 301/37.37; 301/108.4
[58] Field of Search ........................ 301/37.1, 37.37, 301/37.31, 37.34, 108.1, 108.4

[56] References Cited

U.S. PATENT DOCUMENTS

| | | |
|---|---|---|
| 2,016,395 | 10/1935 | Sinclair ............................ 301/37.37 |
| 4,606,582 | 8/1986 | Warren ............................ 301/37.37 |
| 4,725,100 | 2/1988 | Patti ............................ 301/37.34 X |
| 4,787,681 | 11/1988 | Wang et al. ............................ 301/37.37 |
| 4,946,228 | 8/1990 | Hsu et al. ............................ 301/37.37 |
| 5,031,965 | 7/1991 | Buerger ............................ 301/37.37 |
| 5,150,949 | 9/1992 | Wang ............................ 301/37.37 |

Primary Examiner—Russell D. Stormer
Attorney, Agent, or Firm—Waddey & Patterson; Edward D. Lanquist, Jr.

[57] ABSTRACT

The present system discloses a universal wheel trim attachment system in which a wheel liner is attached to a wheel under the wheel lug nuts. Universal wheel trim attachment system has a center piece which can act as a hub cover. Surrounding the opening is a plateau on substantially an X-axis and perpendicular to a Y-axis. Around the plateau there is placed a first incline. Around the first incline there is placed a ledge which merely shows the change in direction between a first incline and a second incline which surrounds the first incline. A valley surrounds the second incline. A ridge surrounds the valley. A lip surrounds the ridge and rests upon the outer portions of the wheel. The wheel liners are also provided with lug holes, oval holes, and hand holes.

2 Claims, 3 Drawing Sheets

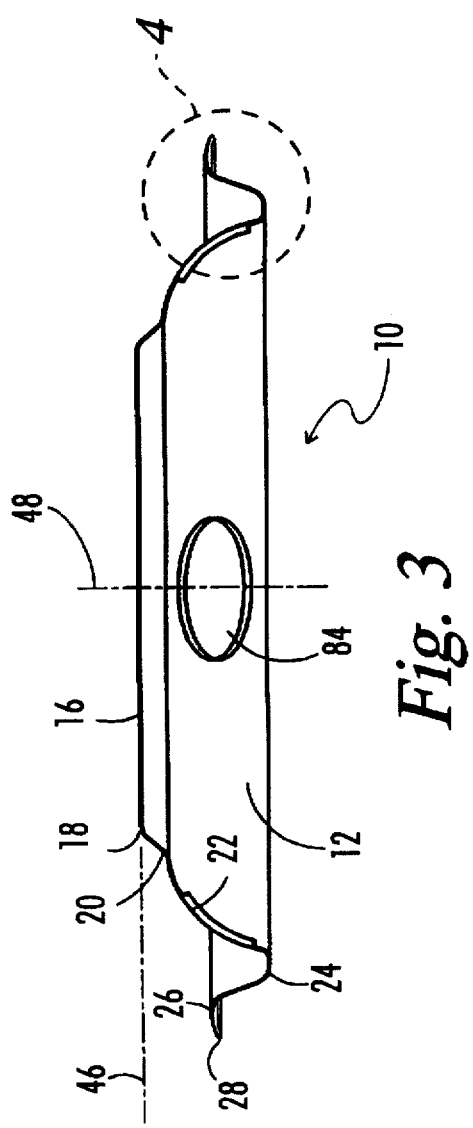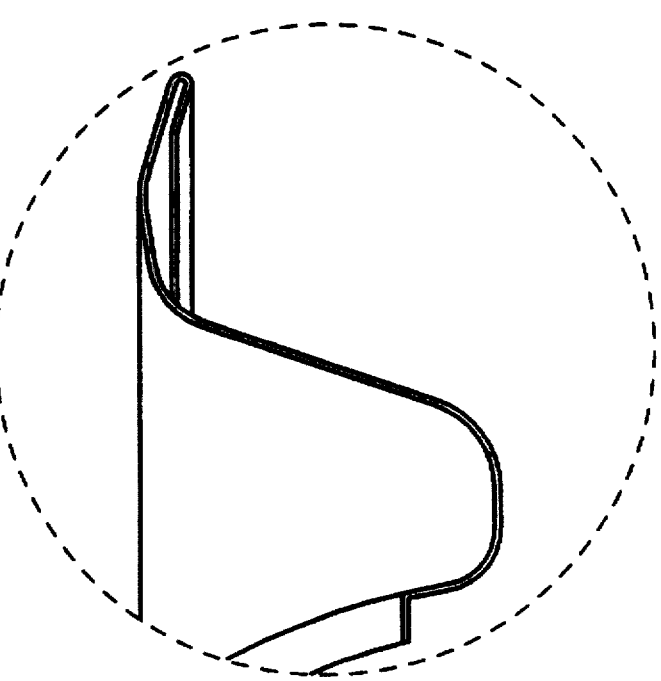

UNIVERSAL WHEEL TRIM ATTATCHMENT SYSTEM

This application is a continuation of application Ser. No. 08/602,508 filed Feb. 20, 1996, now abandoned.

BACKGROUND OF THE INVENTION

The present invention relates generally to wheel trim attachment systems and more particularly to a universal wheel trim attachment system that will mount to both sixteen inch wheels and sixteen and one-half inch dual mount motor vehicle wheels.

It will be appreciated by those skilled in the art that individuals having vehicles such as trucks and other motor vehicles desire to have attractive wheels. Accordingly, wheel liners have been developed to improve the aesthetics of wheels. Unfortunately, in the past, wheels of different sizes and shapes have required different wheel trim systems. Some wholesalers and retailers claim to have universal systems. However, these universal systems, although they can be used on sixteen inch wheels and sixteen and one-half inch dual mount wheels, must be permanently deformed to install on certain wheels. Furthermore, they do not perform their cosmetic goal because they do not fit. It will further be appreciated by those skilled in the art that a retailer desires to have as small of inventory as possible. However, having a different wheel liner for each different wheel requires increased inventory. Finally, it will be appreciated by those skilled in the art that sixteen inch wheels and sixteen and one-half inch dual mount wheels are the two most popular wheels for trucks. Additionally, it will be appreciated by those skilled in the art that hand holes are necessary to prevent the brakes and axle from overheating.

What is needed, then, is a universal system. This system must be capable of use in connection with any sixteen inch wheels or sixteen and one-half inch dual mount wheels. This needed system must be sized with the differences in sizes between the wheels. This system must be shaped with differences in shapes of the wheels. This needed system must have hand holes arranged so that the brakes do not overheat. This needed system must have lug hole arrangements so that it can be attached to various wheels. This system is presently lacking in the prior art.

SUMMARY OF THE INVENTION

The present system discloses a universal wheel trim attachment system in which a wheel liner is attached to a wheel under the wheel lug nuts. Universal wheel trim attachment system has a center piece which can act as a hub cover. Surrounding the center piece is a plateau on substantially an X-axis and perpendicular to a Y-axis. Mound the plateau there is placed a first incline. Around the first incline there is placed a ledge which merely shows the change in direction between a first incline and a second incline which surrounds the first incline. A valley surrounds the second incline. A ridge surrounds the valley. A lip surrounds the ridge and rests upon the outer portions of the wheel. The wheel liners are also provided with lug holes, oval holes, and hand holes.

Accordingly, one object of the present invention is to provide a universal wheel trim attachment system.

Another object of the present invention is to provide a system which can be attached to either a sixteen inch or sixteen and one-half inch dual mount wheel.

A still further object of the present invention is to provide a universal system which can be used in connection with all 1975 to current Ford wheels, 1973 to current Dodge wheels, and 1973 to current General Motors wheels.

Still a further object of the present invention is to reduce the industry normal parts for either sixteen inch or sixteen and one-half inch universal sets by thirty percent.

BRIEF DESCRIPTION OF THE DRAWINGS

FIG. 3 is a side view of the wheel trim system of the present invention.

FIG. 4 is a detailed view showing the valley of the present invention.

DESCRIPTION OF THE PREFERRED EMBODIMENT

Figure 1:
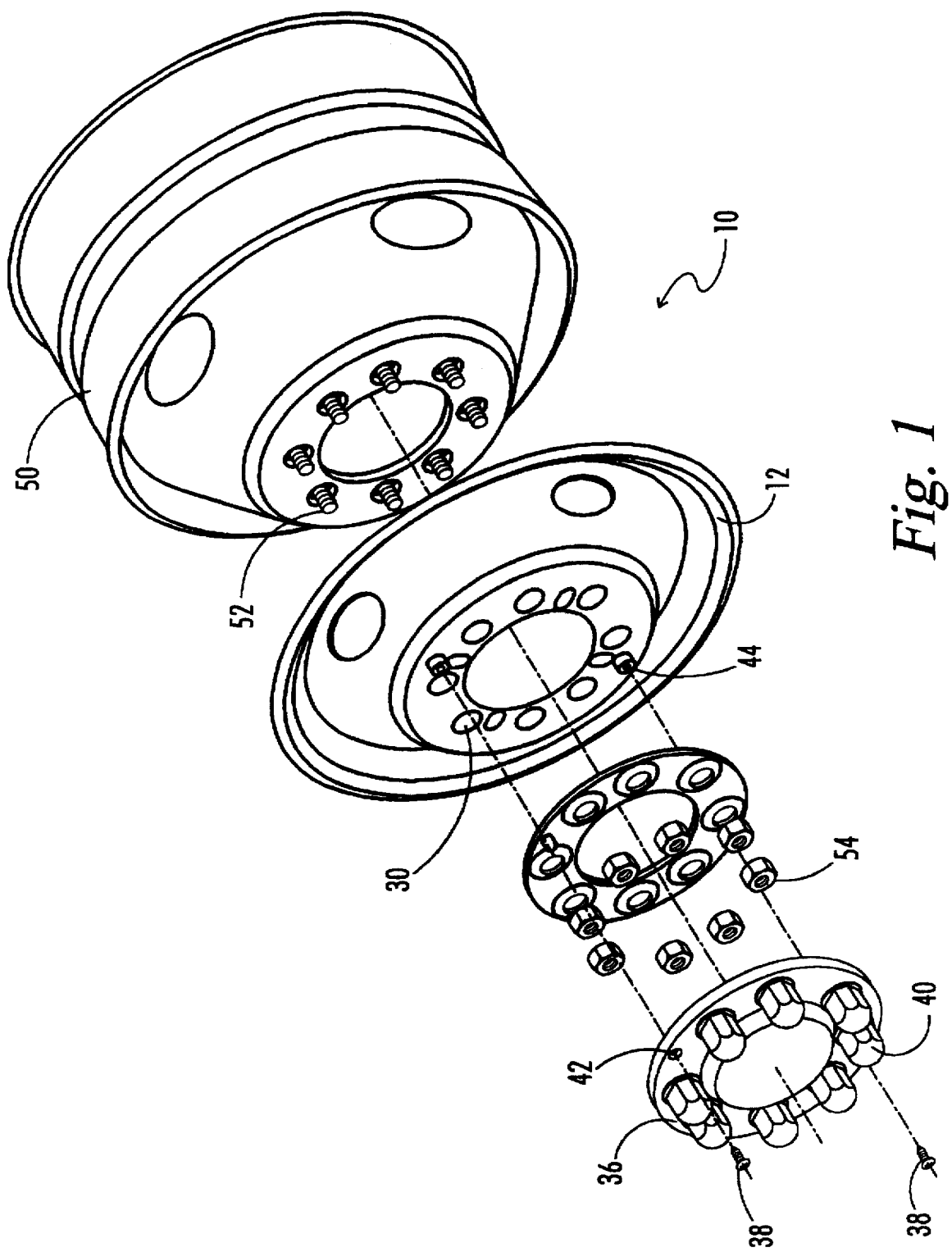
FIG. 1 is an exploded perspective view of the present invention.

Referring now to FIG. 1, there is shown generally at 10 the universal wheel trim attachment system of the present invention. As can be seen, wheel liner 12 attaches to wheel 50. Lug nuts 54 hold wheel liner 12 to wheel 50. Lug nut covers 40 can then be used to cover lug nuts 54. In this particular embodiment, lug nuts 54 hold liner 12 onto wheel 50 for use of lugs 52. Liner 12 has lug holes 30 which receive lugs 52. Hub cover 36 having lug nut covers 40 cover lug nuts 54. Lug nut covers 40 is held in place, in the preferred embodiment, with mounting screws 38 passing through openings 42 and hub cover 36 and passing into mounting orifices 44.

Figure 2:
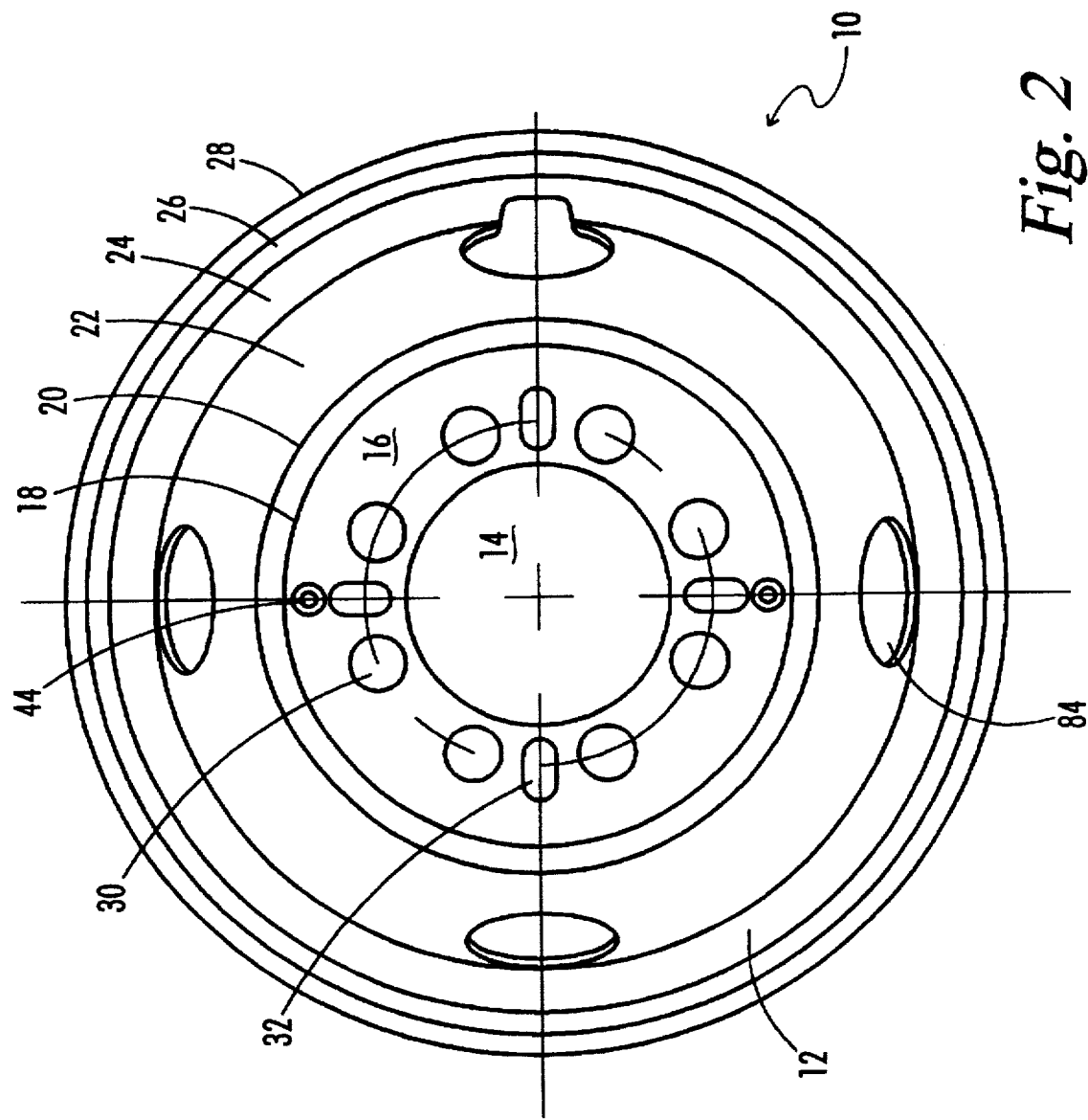
FIG. 2 is a plan view of the universal system of the present invention.

Referring now to FIG. 2, there is shown generally at 10 the universal wheel trim system of the present invention. In the center of wheel liner 12 there is opening 14. Surrounding opening 14 there is plateau 16 which is substantially along an x-axis 46 (as shown in FIG. 3) and perpendicular to a y-axis 48. Surrounding and attached to plateau is first incline 18. Surrounding and attached to first incline 18 is second incline 22 separated by ledge 20. Surrounding and connected to second incline 22 there is valley 24. Surrounding and attached to valley 24 there is ridge 26. Surrounding and attached to ridge 26 there is lip 28. In the preferred embodiment, wheel liner 12 has eight lug holes 30 and four oval holes 32. Oval holes 32 are placed at 0°, 90°, 180°, and 270°. Hand holes 84 are also placed in the orientation as oval holes 32 in the preferred embodiment. In the preferred embodiment, lug holes 30 are placed at approximately 45° from one another from the line drawn from the center of wheel liner 12 through center of lug holes 30. In the preferred embodiment, wheel liner 12 has an outside diameter of substantially 445.5 mm. In the preferred embodiment, hand holes are substantially 71 mm wide and 44 mm deep.

Referring now to FIG. 3 there is shown generally at 10 the wheel liner of the present invention. As can be seen, plateau 16 is along x-axis 46 and perpendicular to y-axis 48. Plateau 16 has an outside diameter of substantially 236.5 mm. First incline 18 has a preferred outside diameter of 267.9 mm, an inside diameter of substantially 236 mm, and a depth along the y-axis 48 of substantially 12.7 mm.

Second incline 22 has an outside diameter of substantially 370.5 mm. Second incline 22 is substantially 49.3 mm 262 mm deep along the y-axis 48 and has a radius of curvature of substantially 54.2 mm, an inside diameter of substantially 267 mm, and outside diameter of substantially 370 mm. Preferably, first incline 18 has a radius of curvature of substantially 0.00 mm.

Valley 24 has a radius of curvature of substantially 5 to 8 mm. Preferably, ridge 26 has an inside diameter of substantially 377 mm and an outside diameter of substantially 405.4 mm. Ridge 26 is substantially 25 mm deep along the y-axis. Ridge 26 has preferably a radius of curvature of substantially 0.0 mm, an inside diameter of substantially 377 mm, and an outside diameter of substantially 405.4 mm, and is aligned substantially 70° from x-axis 46. Lip 28 has an outside diameter of substantially 445.5 mm, an inside diameter of substantially 405.4 mm, and a radius of curvature of substantially 5.9 mm.

Thus, although there have been described particular embodiments of the present invention of a new and useful universal wheel trim attachment system, it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What we claim is:

1. A universal system for attaching a wheel liner to either a sixteen inch or sixteen and a half inch dual mount wheel having lugs and lug nuts, said wheel liner comprising:

a. a center piece;
   b. a plateau integral to and surrounding said center piece having plural lug holes, said plateau forming an x-axis and perpendicular to a y-axis;
   c. a first incline integral to and surrounding said plateau;
   d. a ledge integral to and surrounding said first incline;
   e. a second incline integral to and surrounding said ledge wherein said second incline is substantially 49.3 mm to 62 mm deep along said y-axis and has a radius of curvature of substantially 54.2 mm;
   f. a valley integral to and surrounding said second incline having a radius of curvature of substantially 5 to 8 mm depending on section;
   g. a ridge integral to and surrounding said valley being substantially 25 mm deep along said y-axis; and
   h. a lip integral to an surrounding said ridge;
   i. said plateau has an outside diameter of substantially 236.5 mm;
   j. said first incline has an inside diameter of substantially 236.5 mm and an outside diameter of substantially 267 mm;
   k. said first incline is substantially 12.7 mm deep along said y-axis;
   l. said second incline has an inside diameter of substantially 267 mm and an outside diameter of substantially 370 mm;
   m. said ridge has an inside diameter of substantially 377 mm and an outside diameter of substantially 405.4 mm; and
   n. said lip has an inside diameter of substantially 405 mm and an outside diameter of substantially 445.5 mm.

2. The system of claim 1 wherein said center piece is a hub cover with attached lug nut covers.

* * * * *